United States Patent
Matsumura et al.

(10) Patent No.: US 7,311,760 B2
(45) Date of Patent: Dec. 25, 2007

(54) TEMPERATURE-HUMIDITY EXCHANGER

(75) Inventors: Mitsuie Matsumura, Tokyo (JP); Yoshihide Gonjo, Tokyo (JP); Hideo Ichimura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 493 days.

(21) Appl. No.: 11/049,716

(22) Filed: Feb. 4, 2005

(65) Prior Publication Data
US 2005/0188844 A1  Sep. 1, 2005

(30) Foreign Application Priority Data
Feb. 13, 2004 (JP) ............... 2004-037351

(51) Int. Cl.
*B01D 53/22* (2006.01)
(52) U.S. Cl. .............. 96/4; 96/7; 96/9; 95/45; 95/52; 429/26
(58) Field of Classification Search ........... 96/4, 96/6, 7, 9, 11; 95/45, 52, 55, 56; 429/20, 429/26, 34; 55/502
See application file for complete search history.

(56) References Cited

U.S. PATENT DOCUMENTS

| | | | | |
|---|---|---|---|---|
| 3,735,559 A | * | 5/1973 | Salemme | 95/52 |
| 4,973,530 A | * | 11/1990 | Vanderborgh et al. | 429/26 |
| 5,200,278 A | * | 4/1993 | Watkins et al. | 429/26 |
| 5,965,288 A | * | 10/1999 | Okamoto | 429/26 |
| 6,087,029 A | * | 7/2000 | Golovin et al. | 95/52 |
| 6,171,374 B1 | * | 1/2001 | Barton et al. | 96/7 |
| 6,413,298 B1 | * | 7/2002 | Wnek et al. | 95/52 |
| 6,666,909 B1 | * | 12/2003 | TeGrotenhuis et al. | 95/56 |
| 6,737,183 B1 | * | 5/2004 | Mazzucchelli et al. | 429/26 |
| 6,779,351 B2 | * | 8/2004 | Maisotsenko et al. | 429/20 |
| 2005/0188844 A1 | | 9/2005 | Matsumura et al. | |

FOREIGN PATENT DOCUMENTS

| JP | 2000-164229 | * | 6/2000 |
|---|---|---|---|
| JP | 2003-314983 | * | 11/2003 |
| JP | 2006-289191 | * | 10/2006 |
| JP | 2007-437034 | * | 4/2007 |

OTHER PUBLICATIONS

U.S. Appl. No. 10/581,359, filed Jun. 2, 2006, Gonjo et al.

* cited by examiner

*Primary Examiner*—Jason M. Greene
(74) *Attorney, Agent, or Firm*—Oblon, Spivak, McClelland, Maier & Neustadt, P.C.

(57) ABSTRACT

Provided is an inexpensive temperature-humidity exchanger having reliably gas-sealed gas manifolds and delivering a gas at high pressure and high dew-point temperature. Upper and lower seal portions surrounding gas manifolds to which the gas is supplied or from which the gas is discharged are provided. The upper and lower seal portions, which partially extend across an aggregate communication groove, are respectively constituted by upper and lower seal formation plates that are arranged in a two-stage manner in a laminating direction. The upper and lower seal portions have flat faces extending in the laminating direction. Furthermore, the upper and lower seal formation plates are disposed such that their projections in the laminating direction are offset from each other.

7 Claims, 9 Drawing Sheets

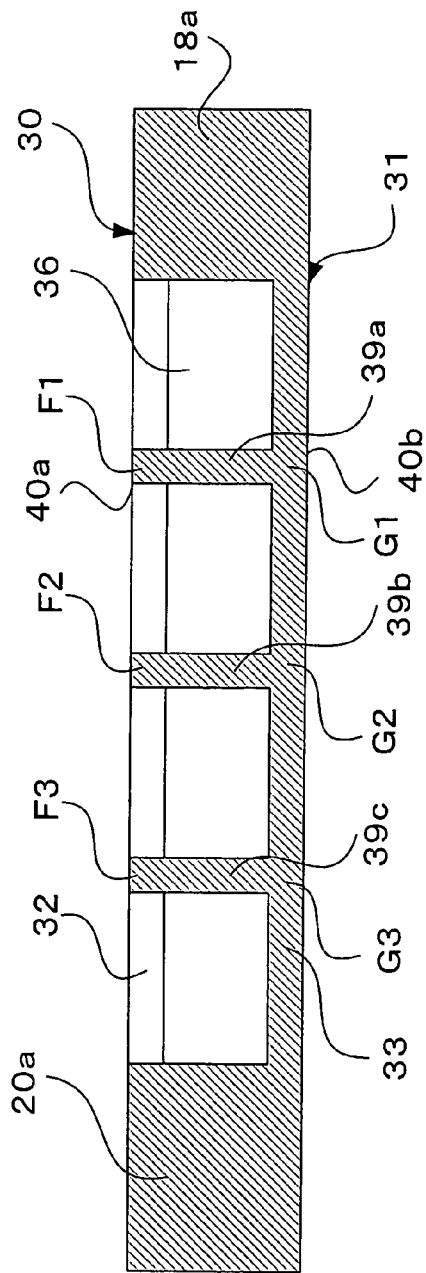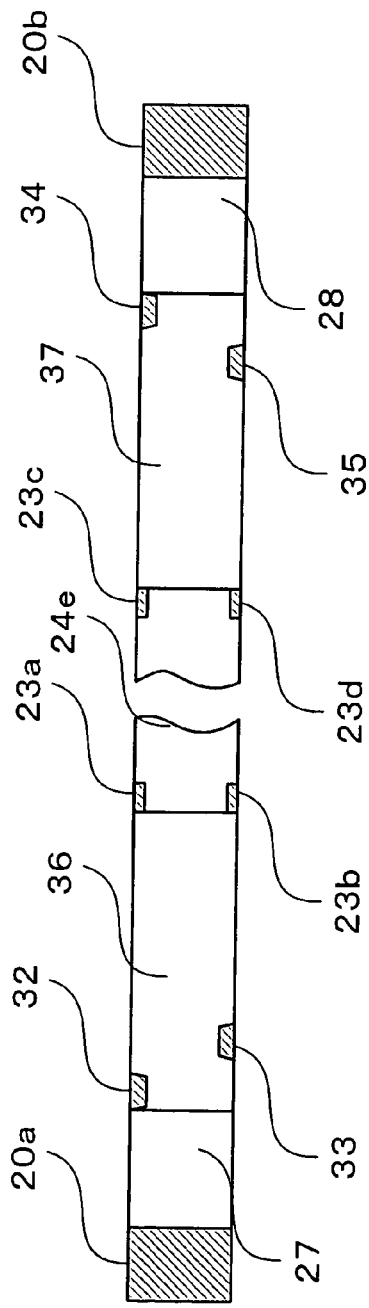

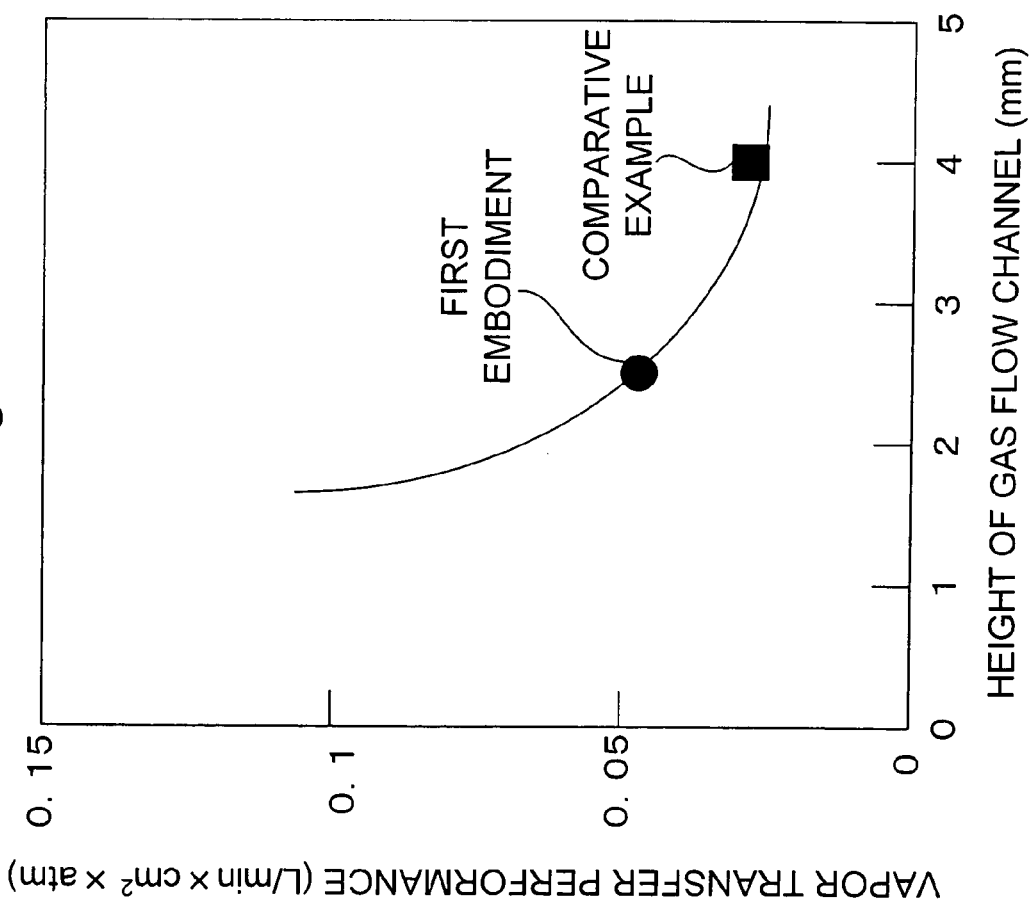

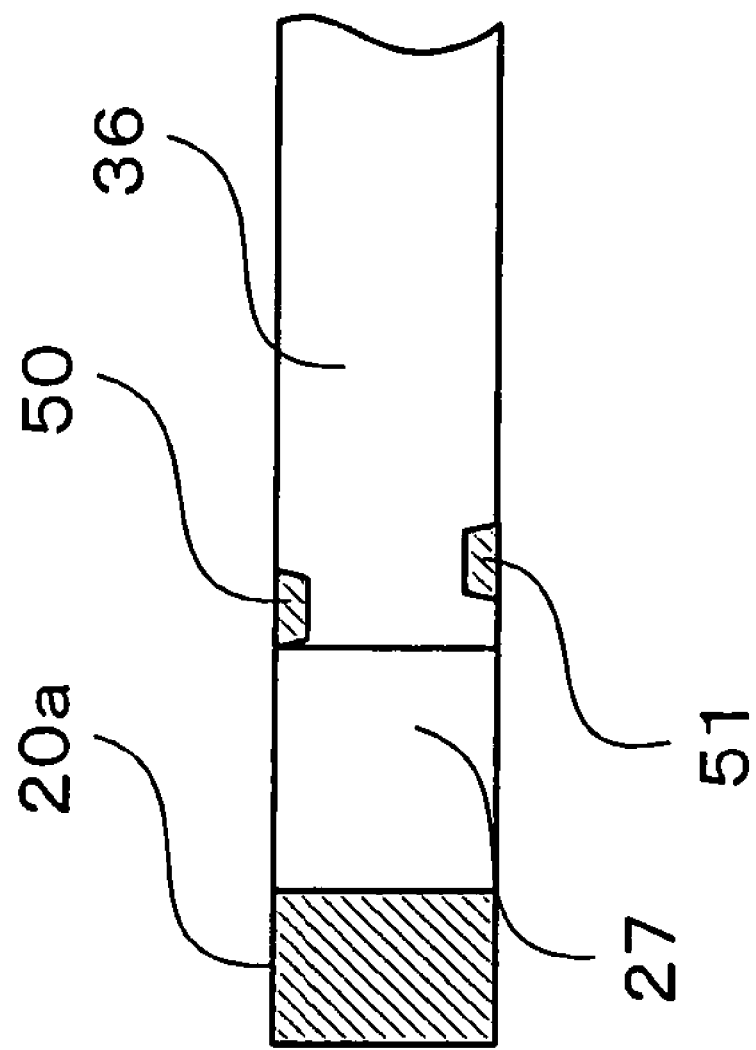

TEMPERATURE-HUMIDITY EXCHANGER

BACKGROUND OF THE INVENTION

1. Field of the Invention

The present invention relates to a temperature-humidity exchanger that heats and humidifies a low-temperature dry gas by heat and moisture which are transferred from a high-temperature moist gas via a permeable membrane permeable to moisture, and more particularly to a fuel-cell temperature-humidity exchanger that heats and humidifies unreacted gases by heat and moisture transferred from an exhaust gas in a fuel cell.

2. Description of the Related Art

A conventional temperature-humidity exchanger is provided with a laminated body that is gas-tight against the outside. This laminated body is obtained by alternately and gas-tightly stacking frame members and permeable membranes in the vertical direction of the frame member. The frame members have an internal space that is open at the top and at the bottom and surrounded by a peripheral frame having a gas inlet and a gas outlet. A fitting protrusion is provided on the side of one of the vertically stacked frame members, and a fitting recess is provided on the side of the other. Gas sealing performance is ensured by fitting the fitting protrusion into the fitting recess. The laminated body has four lateral faces. One of them serves as the moist gas inlet side and the one opposite thereto serves as the moist gas outlet side. Another one of them serves as the gas inlet side and the one opposite thereto serves as the dry gas outlet side. Disposed on each of the four lateral faces of the laminated body is a corresponding one of gas supply and exhaust manifolds. The gas supply and exhaust manifolds are constructed as a rectangular parallelepiped having an open face, against which a sealing face as a projecting portion of the laminated body is pressed via a gasket. Thus, the interiors of the manifolds are connected to the internal space of the adjoining laminated body while gas-tightness is maintained.

However, the sealing face on the side of the laminated body, which is obtained by joining the fitting protrusion and the fitting recess together, is inferior in smoothness and causes a problem in that good sealing performance cannot be guaranteed with ease. The gas supply and exhaust manifolds and a mechanism for clamping them are required, which raises a problem of an overall increase in cost (e.g., see JP 2003-314983 A).

Thus, there has been proposed a temperature-humidity exchanger adopting an internal manifold design which allows gases to flow in a countercurrent manner and has a gas manifold provided in a gas separator. The gas separator is composed of a frame member forming an outer peripheral seal portion and a mesh plate forming a gas channel. The temperature-humidity exchanger, which is constructed of a laminated body obtained by disposing permeable membranes on top and bottom faces of the gas separator and further disposing gas separators on top and bottom faces of the permeable membranes, carries out exchange of heat and moisture between a moist gas and a dry gas via the permeable membranes. In the internal manifold design, since the gas manifold is provided in the gas separator itself, there is no need to provide gas seal between the manifold and the laminated body.

However, although the gas manifold and the permeable membrane are gas-sealed by a gap between the permeable membrane and surfaces of the mesh plate and the frame member surrounding the gas manifold, a dimensional difference in level or a material difference in elasticity or thermal expansion coefficient causes a problem of insufficient gas seal. The mesh plate, which is made of a metal or a polymer, has an uneven surface and thus causes a problem of a further deterioration in gas sealing performance. If an attempt is made to solve this problem by providing a sealing sheet capable of maintaining smoothness, the additional necessity of this sealing sheet entails structural complication. This creates another problem of expensiveness.

Thus, the gas manifold is surrounded by a seal portion integrated with the frame member so as to be gas-sealed by a gap between the seal portion and the permeable membrane. The gas separator is also provided with an underdrain as an entrance which establishes communication between the gas manifold and the mesh plate (e.g., see JP 2000-164229 A).

However, the gas separator, which is provided with the underdrain perpendicular to the laminating direction of the gas separator, cannot be easily mass-produced at a low cost by resin molding. Namely, resin molding includes the steps of preparing a split mold that can be split along one direction of a molded product, injecting liquid resin into the mold, splitting the mold after the resin has been solidified, and taking the molded product out. Therefore, the mold for gas separators cannot be easily provided with a portion corresponding to the underdrain perpendicular to the laminating direction of the gas separator. Thus, the necessity to machine the underdrain through post-machining leads to a problem of high cost.

Also, the thickness of the seal portion surrounding the underdrain in the laminating direction of the gas separator needs to be equal to or greater than a predetermined value with a view to guaranteeing the function of gas seal. For instance, the height of the underdrain with a rectangular cross section in the laminating direction is set as 1.5 mm to hold the pressure loss equal to or below a permissible pressure, and the predetermined thickness of the seal portion in the thickness direction is set as 1.25 mm to prevent a serious deformation from being caused by a pressure acting between the seal portion and the permeable membrane. Therefore, the gas separator is 4 mm thick. Since the mesh plate of the gas separator is also 4 mm thick, the resistance in transferring moisture contained in the moist gas or heat to the permeable membrane is considerably high. This brings about a problem in that the dew-point temperature of the dry gas cannot be raised sufficiently.

SUMMARY OF THE INVENTION

It is an object of the present invention to provide an inexpensive temperature-humidity exchanger having reliably gas-sealed gas manifolds and delivering a gas at high pressure and high dew-point temperature.

According to the present invention, there is provided a temperature-humidity exchanger including a permeable membrane permeable to moisture, a dry gas separator in which a low-temperature dry gas is caused to flow, and a moist gas separator in which a high-temperature moist gas is caused to flow the temperature-humidity exchanger being constructed by repeatedly laminating the permeable membrane, the dry gas separator, the permeable membrane, and the moist gas separator in this order.

In the temperature-humidity exchanger, the dry gas separator and the moist gas separator each includes: a frame member; a plurality of flow channels separated from one another by partitions arranged in parallel in a central portion surrounded by the frame member, the plurality of flow channels being open in the laminating direction; a first supply manifold to which the gas caused to flow is supplied and a first exhaust manifold from which the gas caused to flow is discharged, the first supply and exhaust manifolds penetrating, in the laminating direction, portions of the frame member which are respectively adjacent to both end portions of the plurality of flow channels; two aggregate communication grooves penetrating the frame member in the laminating direction and being constructed by removing the frame member so as to respectively establish communication between the both ends of the plurality of flow channels and the first supply and exhaust manifolds; first upper and lower seal formation plates which are in contact with the first supply manifold and bridged in a two-stage manner across one of the aggregate communication grooves in the laminating direction with a face contacting the permeable membrane being coplanar with a contacting face between the frame member and the permeable membrane, and which are offset from each other when projected onto each other; second upper and lower seal formation plates which are in contact with the first exhaust manifold and bridged in a two-stage manner across the other of the aggregate communication grooves in the laminating direction with a face contacting the permeable membrane being coplanar with a contacting face between the frame member and the permeable membrane, and which are offset from each other when projected onto each other; and second exhaust and supply manifolds disposed adjacent to the first supply and exhaust manifolds respectively and extending through the laminating direction.

Further, in temperature-humidity exchanger, the first supply manifold, the first exhaust manifold, the second supply manifold, and the second exhaust manifold of the dry gas separator are superposed on the second supply manifold, the second exhaust manifold, the first supply manifold, and the first exhaust manifold of the moist gas separator, respectively, via through-holes formed in the permeable membrane.

The effect of the temperature-humidity exchanger according to the present invention resides in that since the seal formation plate reliably ensuring gas seal between the gas separator and the permeable membrane closes only one side of the aggregate communication groove as an entrance portion having a decisive influence on pressure loss, provision of the seal formation plate causes no substantial increase in pressure loss. Thus, the gas separator can be reduced in thickness while the pressure loss is held equal to or below the level of the prior art, and therefore, the flow channel is reduced in height. As a result, the flow rate of a gas caused to flow through the flow channel is increased and the heat and moisture transfer performance can be improved significantly.

BRIEF DESCRIPTION OF THE DRAWINGS

In the accompanying drawings:

FIGS. 6(a) and (b) illustrate how the temperature-humidity exchanger is installed;

FIG. 8 shows vapor transfer performance measurements of the temperature-humidity exchanger according to the first embodiment of the present invention and a temperature-humidity exchanger of a comparative example; and FIG. 9 is a sectional view of an aggregate communication groove of a temperature-humidity exchanger according to a second embodiment of the present invention.

DETAILED DESCRIPTION OF THE PREFERRED EMBODIMENTS

First Embodiment

Figure 1:
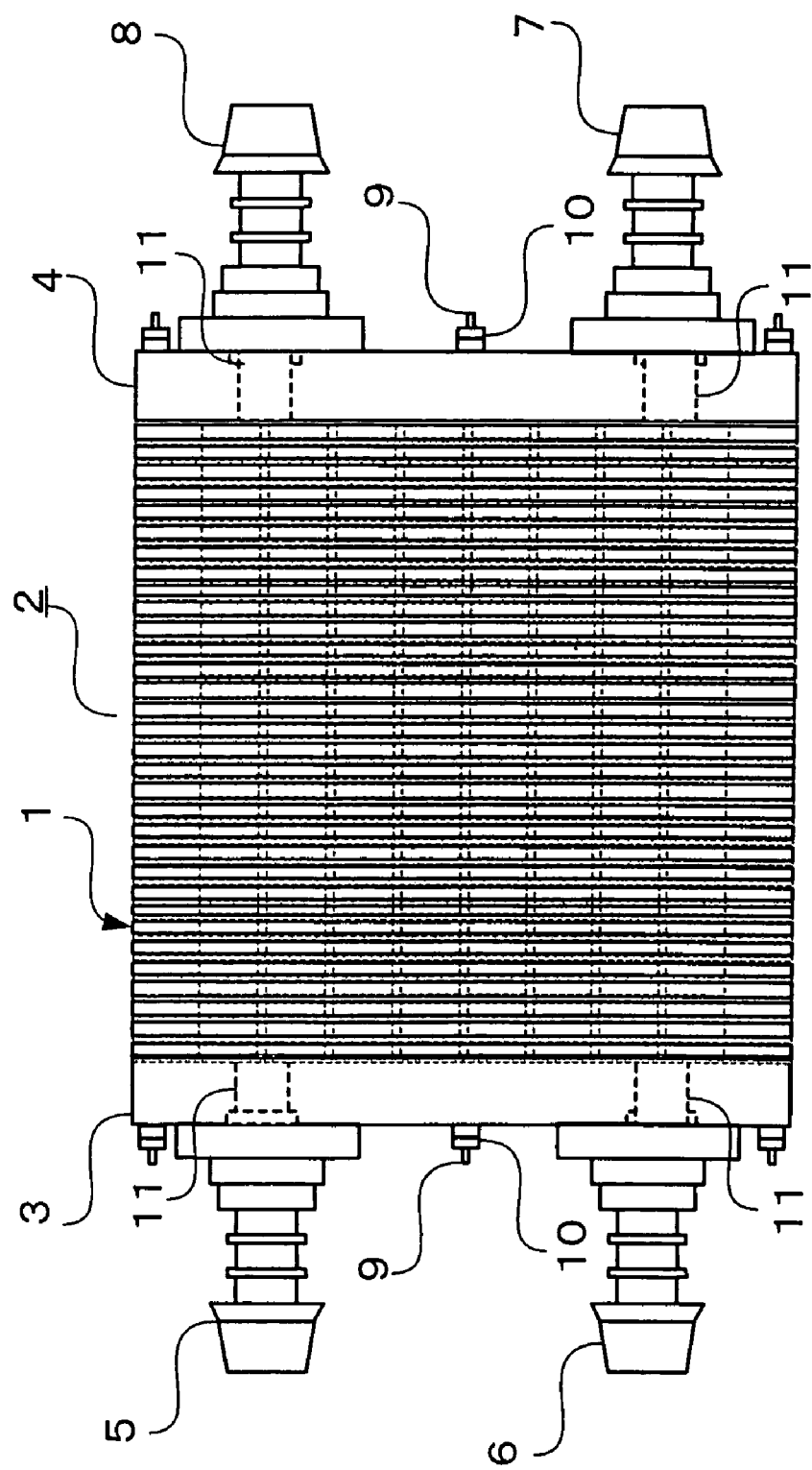
FIG. 1 is a side view of a temperature-humidity exchanger according to a first embodiment of the present invention.
Figure 2:
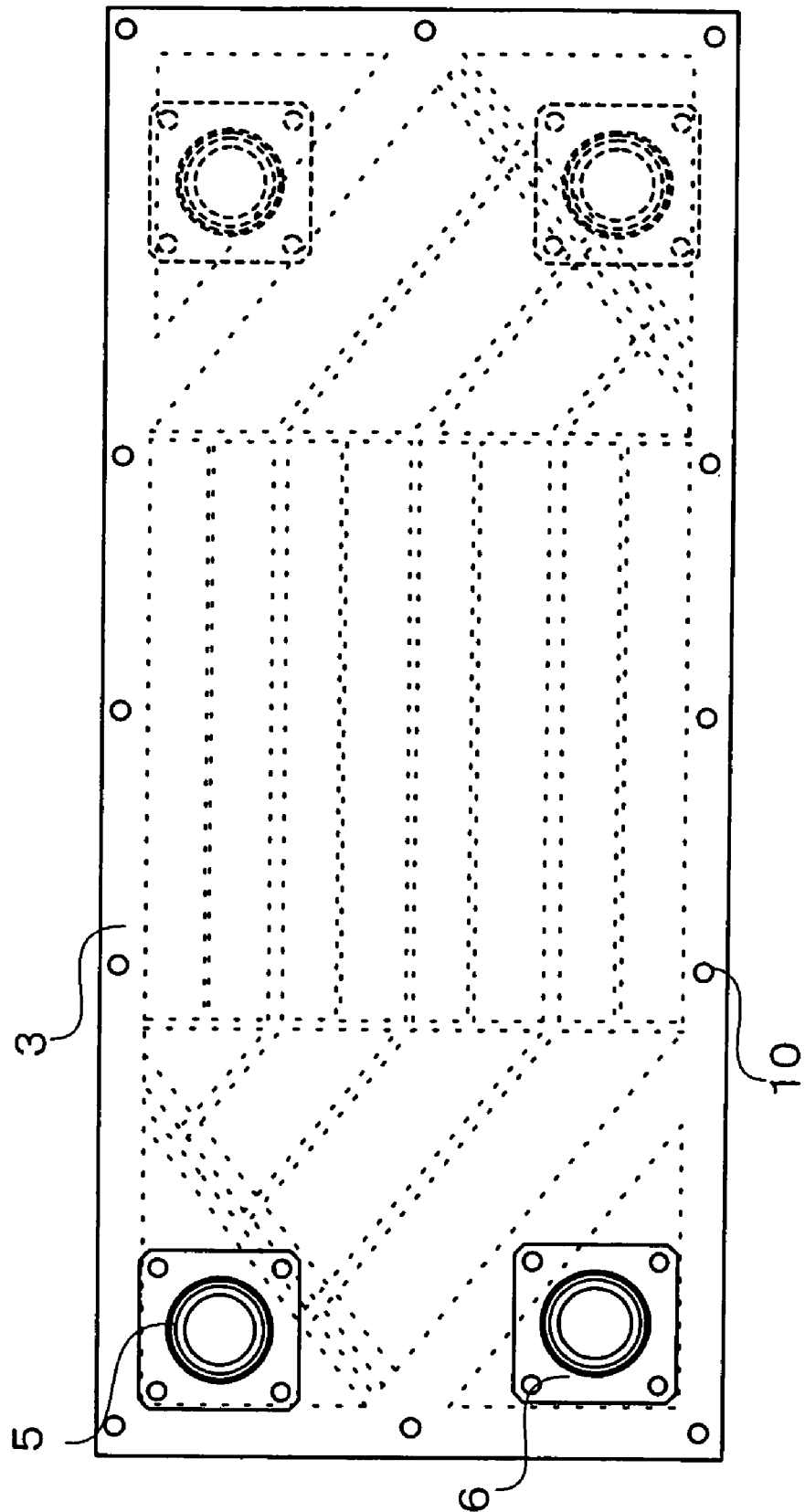
FIG. 2 is a front view of the temperature-humidity exchanger according to the first embodiment of the present invention.
Figure 3:
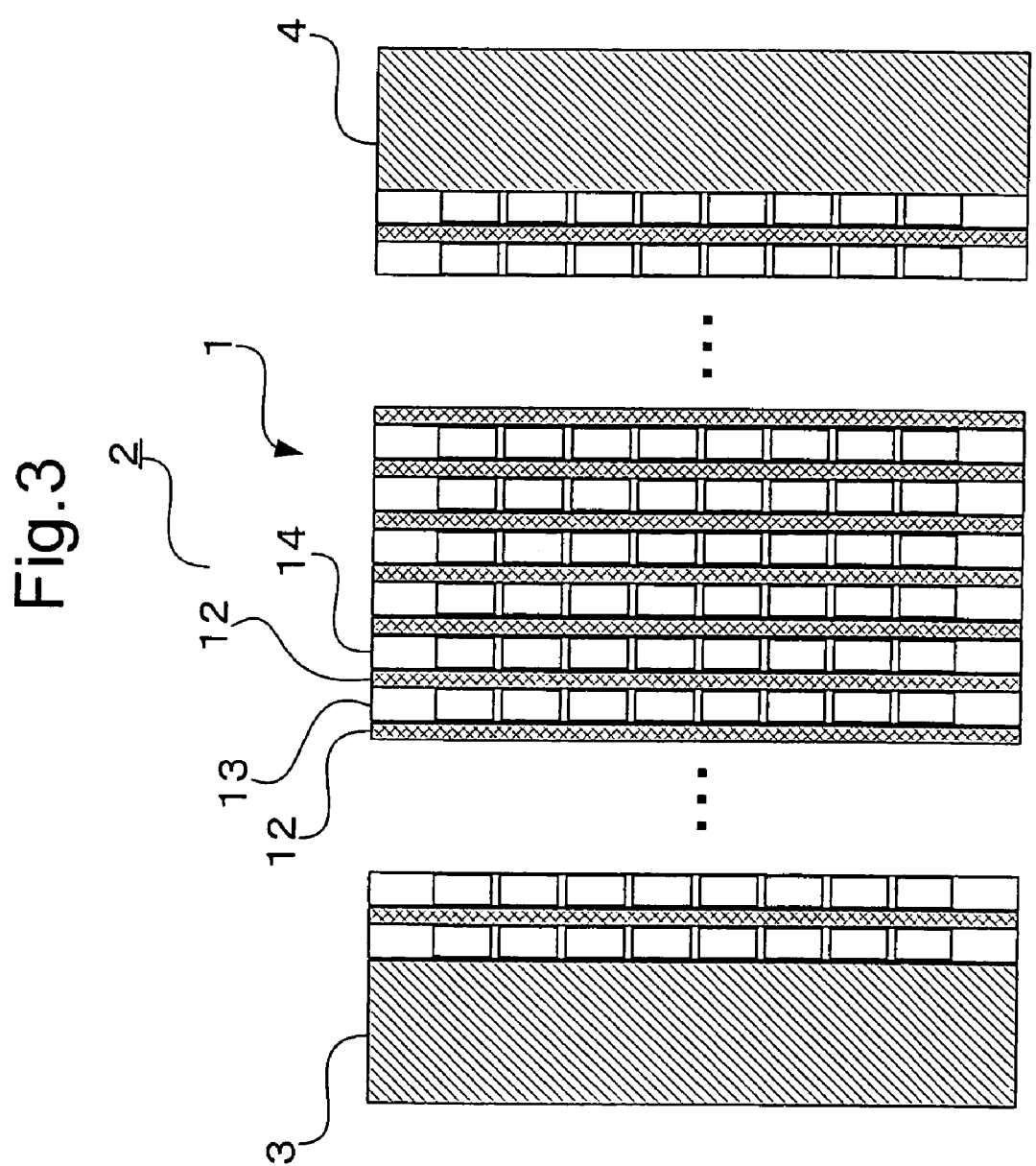
FIG. 3 is a local sectional view of a temperature-humidity exchange laminated body according to the first embodiment of the present invention.
Figure 4:
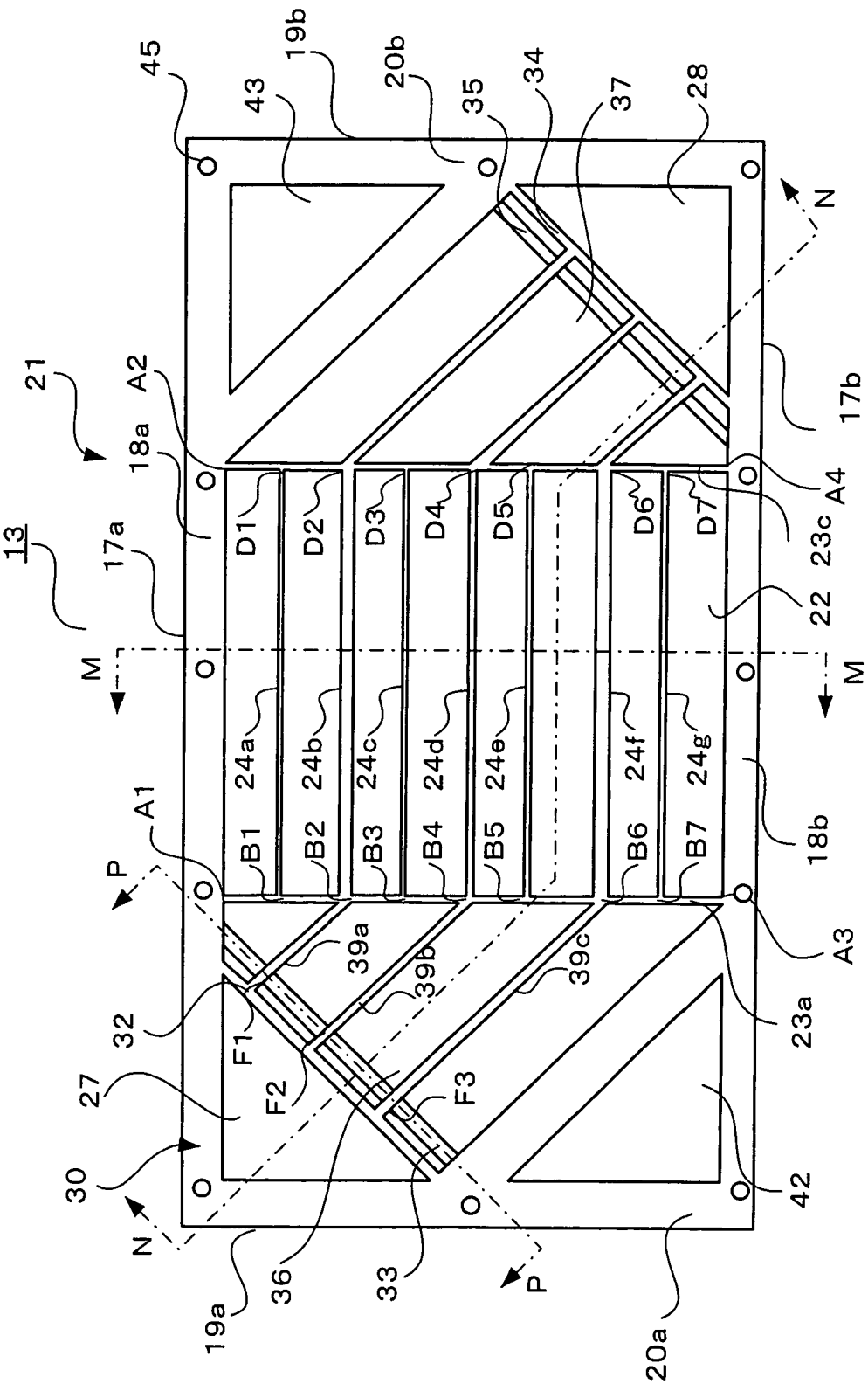
FIG. 4 is a plan view of a dry gas separator of the temperature-humidity exchange laminated body of the first embodiment of the present invention.
Figure 5:
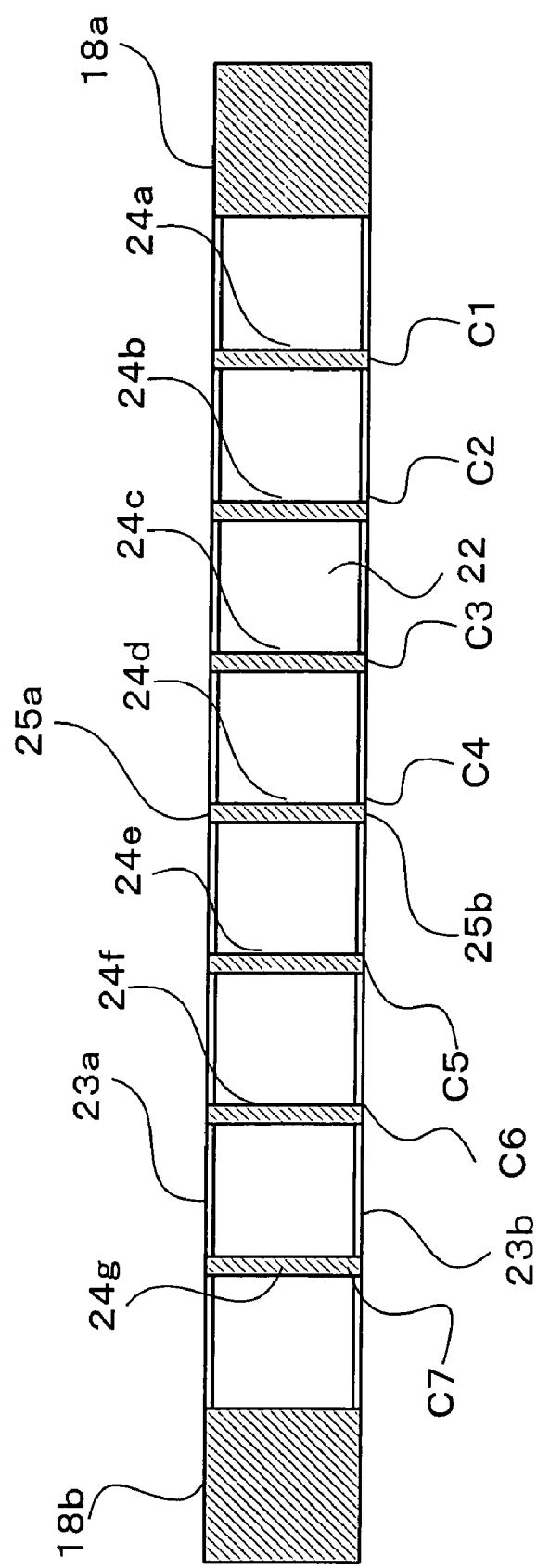
FIG. 5 is a detailed plan view of FIG. 4 as a local sectional view.
Figure 7:
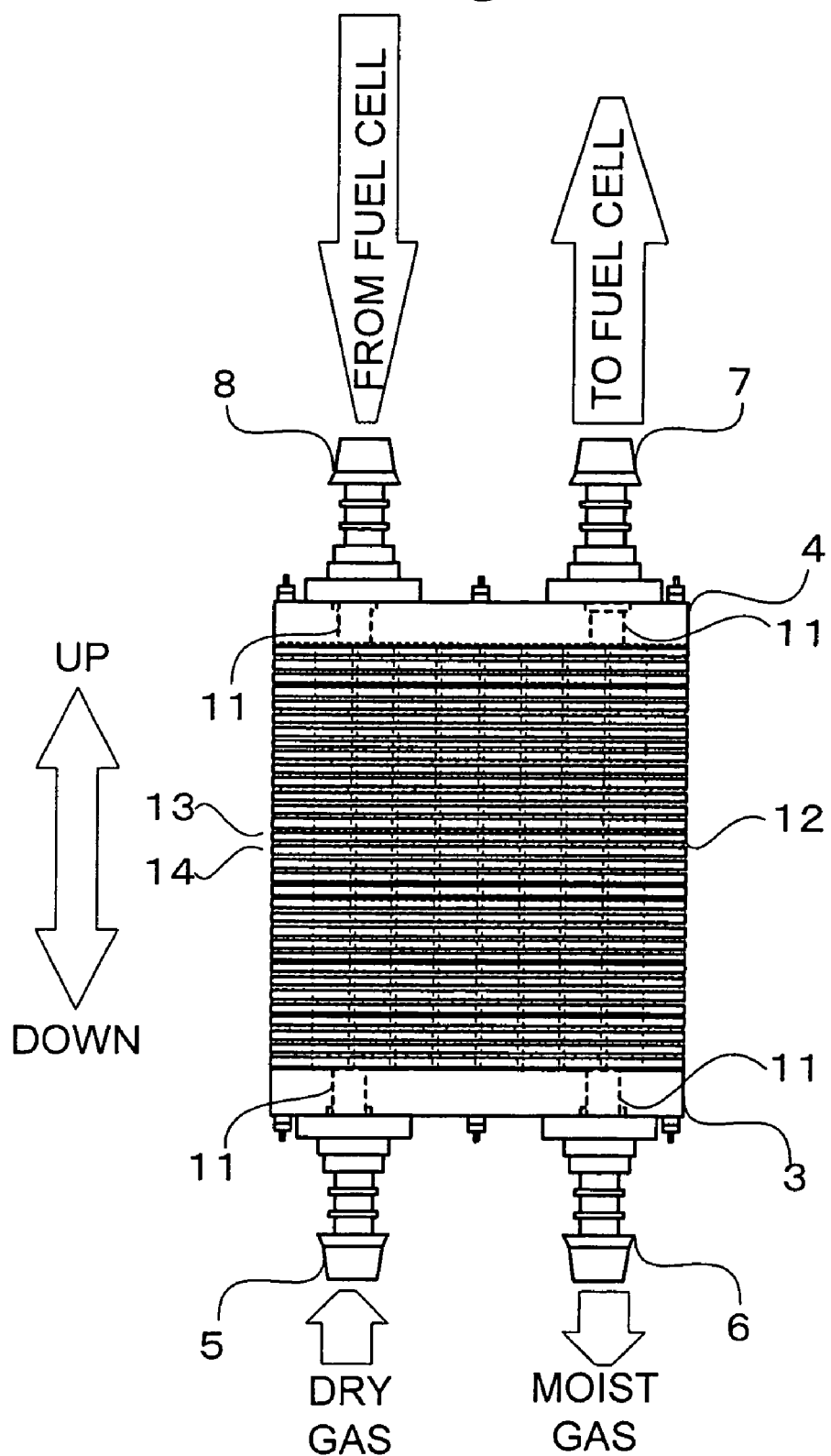
FIG. 7 shows changes in the temperature and humidity of dry the gas and the moist gas.

FIG. 1 is a side view of a temperature-humidity exchanger according to a first embodiment of the present invention. FIG. 2 is a top plan view of the temperature-humidity exchanger according to the first embodiment. FIG. 3 is a partial sectional view of a temperature-humidity exchange cell. FIG. 4 is a plan view of a dry gas separator of a temperature-humidity exchange cell. FIGS. 5 and 6 are sectional views illustrating three cross sections of FIG. 4. In the following description it is assumed that the dry gas has a more or less normal temperature and a relative humidity close to zero. It is also assumed that the moist gas is the same kind as, for example, the dry gas having a temperature equal to or higher than 70° C. and a relative humidity equal to or higher than 90%. For example, this moist gas is air gas serving as an oxidizing gas in a solid polymer fuel cell.

As shown in FIGS. 1 and 2, the temperature-humidity exchanger of the first embodiment has a temperature-humidity exchange laminated body 2, an inlet retainer plate 3, an outlet retainer plate 4, a dry gas inlet manifold 5, a moist gas outlet manifold 6, a dry gas outlet manifold 7, a moist gas inlet manifold 8, bolts 9, and nuts 10. The temperature-humidity exchange laminated body 2, which is composed of a plurality of laminated temperature-humidity exchange cells 1, is sandwiched between the inlet retainer plate 3 and the outlet retainer plate 4. The dry gas inlet manifold 5 and the moist gas outlet manifold 6 are fixed to the inlet retainer plate 3. The dry gas outlet manifold 7 and the moist gas inlet manifold 8 are fixed to the outlet retainer plate 4. The bolts 9 and the nuts 10 are used for pressing the temperature-humidity exchange laminated body 2 tight by the inlet retainer plate 3 and the outlet retainer plate 4 while sandwiching it therebetween. The temperature-humidity exchange laminated body 2 has a rectangular cross section as taken in the direction perpendicular to a laminating direction. This rectangular cross section measures 32 cm long and 15 cm wide.

The inlet retainer plate 3 and the outlet retainer plate 4 are rectangular, that is, identical in shape with the cross section of the temperature-humidity exchange laminated body 2. Formed through each of the inlet and outlet retainer plates 3, 4 are two holes 11, which extend along the short side thereof, namely, in the thickness direction thereof. The dry gas inlet manifold 5 and the moist gas outlet manifold 6 respectively communicate with the two holes 11 of the inlet retainer plate 3, thus constituting a gas flow channel. The dry gas outlet manifold 7 and the moist gas inlet manifold 8 respectively communicate with the two holes 11 of the outlet retainer plate 4, thus constituting a gas flow channel. The inlet and outlet retainer plates 3, 4 are made of stainless and measure 32 cm long, 15 cm wide, and 1 cm thick.

Referring now to FIG. 3, the temperature-humidity exchange cell 1 will be described. The temperature-humidity exchange cell 1 has a permeable membrane 12, a dry gas separator 13, and a moist gas separator 14. Moisture can permeate the permeable membrane 12, which is sandwiched between the dry gas separator 13 and the moist gas separator 14. The temperature-humidity exchange laminated body 2 is constructed by repeatedly laminating the permeable membrane 12, the dry gas separator 13, the permeable membrane 12, and the moist gas separator 14 in this order. At either end of the temperature-humidity exchange laminated body 2 in the laminating direction, the inlet retainer plate 3 or the outlet retainer plate 4 is laminated on the dry gas separator 13 or the moist gas separator 14.

The permeable membrane 12 is permeable to moisture when interposed between high-temperature moist gas and low-temperature dry gas. The permeable membrane 12, which is mainly made of polytetrafluoroethylene (PTFE) as a porous material, is approximately 100 μm thick.

The dry gas separator 13 and the moist gas separator 14 are made of, for example, polyphenylene sulfide (PPS) resin, and formed by resin molding. For instance, a split mold, which can be split in the laminating direction that is common to the dry gas separator 13 and the moist gas separator 14, is prepared. The liquid PPS resin is then injected into the mold. After the PPS resin has been solidified, the mold is split and a molded product is taken out. The dry gas separator 13 and the moist gas separator 14 have the shape of a rectangular parallelepiped measuring 32 cm long, 15 cm wide, and 2.75 mm thick.

Referring now to FIGS. 4, 5 and 6, the dry gas separator 13 will be described. FIG. 5 is a sectional view taken along a line M-M, which is perpendicular to the flow direction of a flow channel 22 of the dry gas separator 13. FIG. 6(a) is a sectional view taken along a line P-P, which is perpendicular to the flow direction of upper and lower seal portions 30, 31. FIG. 6(b) is a sectional view taken along a line N-N, which is parallel to the flow direction extending along the flow channels. The moist gas separator 14 is axisymmetrical to the dry gas separator 13 with respect to a short-side center line. Therefore, the same reference numerals as used for the dry gas separator 13 are assigned to like components of the moist gas separator 14, thus omitting the description thereof.

As shown in FIG. 4, the dry gas separator 13 has a rectangular shape and is provided with a frame member 21, which is composed of lateral frame members 18a, 18b extending along long sides 17a, 17b and end frame members 20a, 20b extending along short sides 19a, 19b. The frame member 21 is 2.75 mm thick.

Furthermore, the flow channel 22 extending parallel to the long sides 17a, 17b is provided in a longitudinally central portion of the frame member 21, that is, in a center part surrounded by the frame member 21. In addition, support points A1, A2, which are spaced apart from each other by a distance corresponding to the length of the flow channel 22, are set on an inner lateral face of the lateral frame member 18a, and support points A3, A4, which are spaced apart from each other by a distance corresponding to the length of the flow channel 22, are set on an inner lateral face of the lateral frame member 18b. Partition support bars 23a, 23b (FIG. 6(b)) are bridged in a two-stage manner in the laminating direction between the support points A1, A3, and partition support bars 23c, 23d (FIG. 6(b)) are bridged in a two-stage manner in the laminating direction between the support points A2, A4. Laminating-direction-wise upper faces of the partition support bars 23a, 23c, which are located on the upper stage with respect to the laminating direction, are coplanar with laminating-direction-wise upper faces of the lateral frame members 18a, 18b and the end frame members 20a, 20b, and laminating-direction-wise lower faces of the partition support bars 23b, 23d, which are located on the lower stage with respect to the laminating direction, are coplanar with laminating-direction-wise lower faces of the lateral frame members 18a, 18b and the end frame members 20a, 20b. The partition support bars 23a, 23b, 23c, and 23d are 1 mm thick in the laminating direction and 1.5 mm wide in the longitudinal direction.

In addition, support points B1 to B7 and support points C1 to C7 (FIG. 5), which divide the segment defined by the support points A1, A3 into eight equidistant ones, are set on the partition support bars 23a, 23b respectively, and support points D1 to D7 and support points E1 to E7 (not shown), which divide the segment defined by the support points A2, A4 into eight equidistant ones, are set on the partition support bars 23c, 23d respectively. A partition 24a is a rectangular parallelepiped. The long and short sides of the partition 24a, which correspond to the length and height of the flow channel 22 respectively, measure 20 cm and 2.75 mm respectively. The thickness of the partition 24a, which divides the flow channel 22, is 1 mm. The long sides of the partition 24a are supported at their four corners by the support points B1, C1, D1, and E1. The partition 24a divides the flow channel 22 as viewed in the direction of the short side of the dry gas separator 13. Similarly, partitions 24b to 24g, which are supported at their four corners by the support points B2 to B7, C2 to C7, D2 to D7, and E2 to E7 respectively, are disposed parallel to the partition 24a. Herein, the seven partitions 24a, 24b, 24c, 24d, 24e, 24f, and 24g are also collectively referred to as partitions 24. A laminating-direction-wise upper long end face 25a (FIG. 5) of the partition 24 is coplanar with the laminating-direction-wise upper faces of the lateral frame members 18a, 18b and the end frame members 20a, 20b, and a laminating-direction-wise lower long end face 25b (FIG. 5) of the partition 24 is coplanar with the laminating-direction-wise lower faces of the lateral frame members 18a, 18b and the end frame members 20a, 20b. The partitions 24 are configured such that the flow channel 22 is surrounded by the partitions 24 and the vertically laminated permeable membranes 12.

To prevent the slacking or the like of the permeable membranes 12, it is desirable to support them at the pitch of, for example, several millimeters to 10 mm. For this reason, the seven partitions 24 are disposed in the flow channel 22.

Furthermore, a first dry gas supply manifold 27 extending through the dry gas separator 13 in the laminating direction is provided at a long-side end of the dry gas separator 13. A first dry gas exhaust manifold 28 extending through the dry gas separator 13 in the laminating direction is provided at such a location as to be point-symmetrical to the first dry gas supply manifold 27 by 180° with respect to a center point of the dry gas separator 13.

In addition, as shown in FIGS. 4 and 6(a), the dry gas separator 13 is provided with the vertically staged upper and lower seal portions 30, 31 (FIG. 6) in the laminating direction, i.e., in such a direction as to surround the first dry gas supply manifold 27. The upper seal portion 30 is composed of the lateral frame member 18a, the end frame member 20a, and an upper seal formation plate 32. The lateral frame member 18a and the end frame member 20a surround the peripheries of the first dry gas supply manifold 27 located close to the laminating-direction-wise upper face of the dry gas separator 13. The upper seal formation plate 32 is bridged between the lateral frame member 18a and the end frame member 20a. A laminating-direction-wise upper face of the upper seal formation plate 32 is coplanar with the laminating-direction-wise upper faces of the lateral frame member 18a and the end frame member 20a, and the upper seal formation plate 32 is 1 mm thick in the laminating direction. The lower seal portion 31 is composed of the lateral frame member 18a, the end frame member 20a, and a lower seal formation plate 33. The lateral frame member 18a and the end frame member 20a surround the peripheries of the first dry gas supply manifold 27 located close to the laminating-direction-wise lower face of the dry gas separator 13. The lower seal formation plate 33 is bridged between the lateral frame member 18a and the end frame member 20a. A laminating-direction-wise lower face of the lower seal formation plate 33 is coplanar with the laminating-direction-wise lower faces of the lateral frame member 18a and the end frame member 20a, and the lower seal formation plate 33 is 1 mm thick in the laminating direction. The upper and lower seal formation plates 32, 33 are disposed so as not to overlap with each other when projected in the laminating direction.

Thus, the first dry gas supply manifold 27 is gas-sealed owing to the pressure welding of the permeable membranes 12 laminated from above with the upper seal portion 30 surrounding the first dry gas supply manifold 27. Further, the first dry gas supply manifold 27 is gas-sealed owing to the pressure welding of the permeable membranes 12 laminated from below with the lower seal portion 31 surrounding the first dry gas supply manifold 27. Accordingly, there is no difference in level or material between the permeable membranes 12 and the upper and lower seal portions 30, 31, and as a result, good sealing performance is achieved.

Further, because the lower and upper faces of the upper and lower seal formation plates 32, 33 are respectively tapered in the direction in which the gas flows, an enlargement of flow channel cross section, a reduction in flow resistance, and a reduction in pressure loss can be achieved.

Moreover, as shown in FIGS. 4 and 6(b), the dry gas separator 13 is provided with aggregate communication grooves 36, 37. The aggregate communication groove 36 establishes communication between the first dry gas supply manifold 27 and one end of the flow channel 22 and supplies the dry gas, which is caused to flow, from the first dry gas supply manifold 27 to the flow channel 22. The aggregate communication groove 37 establishes communication between the other end of the flow channel 22 and the first dry gas exhaust manifold 28 and discharges the dry gas, which is caused to flow, from the flow channel 22 to the first dry gas exhaust manifold 28. Support points F1 to F3 and G1 to G3, which divide the segment extending across the aggregate communication groove 36 between the lateral frame member 18a and the end frame member 20a into four equidistant ones, are set on the upper and lower seal formation plates 32, 33 respectively. A support wall 39a, which is a rectangular parallelepiped, is supported at its four corners by the four support points B2, C2, F1, and G1 and divides the aggregate communication groove 36. Herein, three support walls 39a, 39b, and 39c are often collectively referred to as the support wall 39. A laminating-direction-wise upper end face 40a of the support wall 39 is coplanar with the laminating-direction-wise upper face of the lateral frame member 18a, and a laminating-direction-wise lower end face 40b of the support wall 39 is coplanar with the laminating-direction-wise lower face of the lateral frame member 18a.

While the seven partitions 24 are disposed in the flow channel 22, the three support walls 39 are disposed in the aggregate communication grooves 36, 37 respectively because the aggregate communication grooves 36, 37 are narrower in width than the flow channel 22. Further, since the support walls 39 are connected to the partitions 24, the permeable membranes 12 are supported in a stepless manner from the first dry gas supply manifold 27 to the first dry gas exhaust manifold 28.

Moreover, a second upper seal formation plate 34 and a second lower seal formation plate 35 are similarly provided around the first dry gas exhaust manifold 28 as well.

Because each of the aggregate communication grooves 36, 37 is thus provided with the three support walls 39, the upper and lower seal formation plates 32, 34 and 33, 35 with a thickness of 1 mm, which are less strong than the lateral and end frame members 18a, 18b and 20a, 20b with a thickness of 2.75 mm, are reinforced.

The dry gas separator 13 is further provided with a second moist gas exhaust manifold 42 and a second moist gas supply manifold 43. The second moist gas exhaust manifold 42 extends through the dry gas separator 13 along the short side 19a and is located adjacent to the first dry gas supply manifold 27. The second moist gas supply manifold 43 extends through the dry gas separator 13 along the short side 19b and is located adjacent to the first dry gas exhaust manifold 28.

Furthermore, threaded holes 45 are formed along the outer periphery of the dry gas separator 13, which is fixed by passing the bolts 9 through the threaded holes 45 and tightening the bolts 9 from both ends thereof with the aid of the nuts 10. The first dry gas supply manifold 27, the first dry gas exhaust manifold 28, the second moist gas exhaust manifold 42, and the second moist gas supply manifold 43 are point-symmetrical to one another by 180° with respect to the center point of the dry gas separator 13.

Those portions of the permeable membranes 12 which face the flow channel 22 and the aggregate communication grooves 36, 37 effectively contribute to temperature exchange and humidity exchange.

On the other hand, the moist gas separator 14 is so provided as to be superposed on the first flow channel 22, the second moist gas supply manifold 43, the second moist gas exhaust manifold 42, the first dry gas supply manifold 27, and the first dry gas exhaust manifold 28 when a second flow channel (not shown), the first moist gas supply manifold, the first moist gas exhaust manifold, the second dry gas supply manifold, and the second dry gas exhaust manifold are superposed on the dry gas separator 13 via the permeable membranes 12. The moist gas separator 14 is reverse to the dry gas separator 13 with respect to a short-side direction.

As described thus far, the dry gas separator 13 and the moist gas separator 14 are reverse to each other with respect to the short-side direction and can be molded from resin using a common mold. Therefore, a single mold suffices and cost reduction is achieved. Further, since the dry gas separator 13 and the moist gas separator 14 are composed of the same components, the management man-hours and the like can be lowered.

In the aggregate communication grooves 36, 37, the support walls 39 of the dry gas separator 13 intersect with those of the moist gas separator 14, and hence, the permeable membranes 12 can be effectively supported by a reduced number of the support walls 39.

Through-holes (not shown) are provided in the permeable membranes 12 so as to be superposed on the first dry gas supply manifold 27, the first dry gas exhaust manifold 28, the second moist gas exhaust manifold 42, and the second moist gas supply manifold 43 respectively when the permeable membranes 12 are laid on the dry gas separator 13.

As shown in FIG. 3, the permeable membranes 12 are each supported by an upper end face 25a of the partition 24 of the dry gas separator 13, a lower end face of the partition of the moist gas separator 14, a lower end face 25b of the partition 24 of the dry gas separator 13, and an upper end face of the partition of the moist gas separator 14.

The temperature-humidity exchanger thus constructed is disposed as shown in FIGS. 6(a) and 6(b). Namely, the permeable membrane 12 is disposed horizontally so that its normal is directed vertically, and hence, the dry gas separator 13 and the moist gas separator 14 are also laminated to be in contact with the permeable membrane 12 horizontally.

The inlet retainer plate 3 is laminated to be in contact with the lowermost one of the temperature-humidity exchange cells 1, and the outlet retainer plate 4 is laminated to be in contact with the uppermost one of the temperature-humidity exchange cells 1.

Referring now to FIGS. 4, 6(a) and 6(b), it will be explained how moisture and heat are transferred from the moist gas to the dry gas using the temperature-humidity exchanger according to the first embodiment. The dry gas is supplied from the dry gas inlet manifold 5, passes through the holes 11 in the inlet retainer plate 3, and is caused to flow into the first dry gas supply manifold 27 provided in the dry gas separator 13. The dry gas is further caused to flow into the first flow channel 22 through the aggregate communication groove 36 of the dry gas separator 13, and is introduced into the dry gas exhaust manifold 28 from the aggregate communication groove 37. The dry gas is then caused to flow from the first dry gas exhaust manifold 28 into the dry gas outlet manifold 7 via the holes 11 in the outlet retainer plate 4. This dry gas is supplied to the fuel cell.

The dry gas supplied to the fuel cell is moistened by water produced by a reaction between hydrogen and oxygen and water transferred by an ion-exchange membrane together with protons, heated by the heat of the reaction between hydrogen and oxygen, and discharged as the moist gas. The moist gas is therefore higher in temperature and humidity than the dry gas.

This moist gas is supplied from the moist gas inlet manifold 8, passes through the holes 11 in the outlet retainer plate 4, and is drawn into the first moist gas supply manifold provided in the moist gas separator 14. The moist gas is further caused to flow from the aggregate communication groove 36 of the moist gas separator 14 through the second flow channel, and introduced from the aggregate communication groove 37 into the first moist gas exhaust manifold. The moist gas is then introduced from the first moist gas exhaust manifold into the moist gas outlet manifold 6 through the holes 11 in the inlet retainer plate 3, and discharged to the outside.

The dry gas and the moist gas, which flow in a counter-current manner parallel to the long sides of the dry gas separator 13 and the moist gas separator 14 between which the permeable membrane 12 is interposed, are caused to flow through the first flow channel 22 and the second flow channel respectively.

The vapor transfer performance of the temperature-humidity exchanger thus constructed was measured. FIG. 8 shows the result of this measurement in relation to the height of the gas flow channel. At the same time, the temperature-humidity exchanger disclosed in JP 2000-164229 A was prepared as a comparative example, and the vapor transfer performance thereof was measured in a similar manner. Those temperature-humidity exchangers equally rank as the 1 kW class.

The vapor transfer performances of the temperature-humidity exchangers according to the first embodiment and the comparative example are 0.05 (1/min×cm²×atm) and 0.035 (1/min×cm²×atm) respectively, which means an improvement factor of about 70%. The pressure losses according to the first embodiment and the comparative example are 0.82 (Pa) and 0.81 (Pa) respectively, which means no substantial difference.

Referring to this result, since the vapor transfer performance is inversely proportional to the height of the flow channel, it is possible to affirm that the improvement in vapor transfer performance is ascribable to the reduction in the height of the flow channel. The difference in pressure loss is considered to result from the fact that while the aggregate communication grooves are provided with the seal formation plates in such a manner as to close only one opening against the flow of gas in the first embodiment, the underdrain exists between the gas manifold and the flow channel in the comparative example. This signifies that the permeable membranes can be reduced in area approximately by 40% to realize the vapor transfer performance of the prior art.

Since the temperature-humidity exchanger thus constructed is provided with the seal portion surrounding the gas manifold and evenly abutting on the permeable membrane, the gas manifold is gas-sealed reliably. At the same time, since the seal formation plate ensuring gas seal between the gas separator and the permeable membrane closes only one side of the aggregate communication groove as an entrance portion having a decisive influence on pressure loss, the provision of the seal formation plate does not cause an increase in pressure loss.

Further, because the aggregate communication groove is provided, the reduction in the thickness of the gas separator does not lead to an increase in pressure loss in the entrance portions continuing from the supply and exhaust manifolds. By reducing the thickness of the gas separator while suppressing the pressure loss equal to or below a predetermined value, the height of the flow channel is reduced and thus the flow rate of the gas caused to flow therethrough is increased. Therefore, the heat and moisture transfer performance can be enormously improved. In this manner, the dew-point temperature of the delivered gas can be heightened and the pressure of the gas can be increased.

Further, since the upper and lower seal formation plates are connected to each other via the support wall, a high rigidity resulting from the combination of the upper and lower seal formation plates is obtained, and the permeable membrane is further sealed by the seal portion reliably.

Further, since the permeable membrane is supported from its both sides by the partitions of the dry gas separator and the moist gas separator, the rippling or the like of the permeable membrane is prevented from being caused by the gas flow and the turbulence of the gas flow can be obviated in consequence. Therefore, the pressure loss can be reduced.

Further, the connection of the partition with the support wall brings about an increase in rigidity. Also, since there is no difference in level from the supply manifold to the exhaust manifold, the permeable membrane can be supported more reliably.

Further, since a greater number of the partitions are provided in the wide flow channel, the rippling or the like of the permeable membrane is prevented from being caused by the gas flow and the turbulence of the gas flow can be obviated in consequence. Therefore, the pressure loss can be reduced.

Further, the gas separators, which do not overlap with each other when viewed from above, can be molded from resin at a low cost using a standard two-part split mold. In this case, all the components including the upper seal formation plate, the lower seal formation plate, the support walls, the partitions, and the partition support bars can be integrally molded. Preparation of the gas separators and the permeable membranes alone serves to constitute the main part of the laminated body of the temperature-humidity exchanger and to realize a considerable reduction in cost.

Second Embodiment

FIG. 9 is a sectional view of an aggregate communication groove of a dry gas separator of a temperature-humidity exchanger according to a second embodiment of the present invention. This temperature-humidity exchanger of the second embodiment is different from that of the first embodiment only in the arrangement of upper and lower seal formation plates that are bridged across the aggregate communication groove. Those temperature-humidity exchangers are identical or similar in all the other respects, which will not be described hereinafter.

As shown in FIG. 9, upper and lower seal formation plates 50, 51, which are bridged as two vertically arranged stages in the laminating direction of the dry gas separator 13, are so disposed as to partially overlap with each other when projected in the laminating direction. The overlapping portions of the upper and lower seal formation plates 50, 51 are partially tapered in the direction in which the gas is caused to flow. This tapering means a gradual decrease in the hydraulically equivalent diameter of the overlapping portions and thus causes no sudden pressure loss.

In the temperature-humidity exchanger thus constructed, the upper and lower seal formation plates are so disposed as to partially overlap with each other as viewed in the laminating direction. Therefore, the permeable membrane contiguously abuts on the upper and lower seal formation plates as viewed in the laminating direction and can be reliably gas-sealed from above and below.

Although the support wall and the partition are connected to each other in the first embodiment, they may be separated from each other. Further, a single, undivided aggregate communication groove having no support wall may be provided. Further, the distance between adjacent ones of the support walls may be appropriately determined using a general structural strength algorithm. Still further, the arrangement pitch or width of the partitions is not limited as stated in the description of the first embodiment but may be appropriately determined according to the strength specification of the permeable membranes. Still further, the partitions may be partially notched to cause gases in flow channel portions defined by adjacent ones of the partitions to suitably mix with each other. In addition, the transfer of substances may be homogenized or promoted by setting a turbulence-causing spot in the flow channel.

Although the partition support bars 23a, 23b and the partition support bars 23c, 23d are both bridged in a two-stage manner in the laminating direction according to the examples shown above, only the partition support bar 23a or 23b and only the partition support bar 23c or 23d may be bridged. It is more desirable that the partition support bars 23a, 23b or the partition support bars 23c, 23d be offset from each other when they are projected in the laminating direction. This makes it easy to mold the separators from resin.

What is claimed is:

1. A temperature-humidity exchanger comprising: a permeable membrane permeable to moisture; a dry gas separator in which a low-temperature dry gas is caused to flow; and a moist gas separator in which a high-temperature moist gas is caused to flow, the temperature-humidity exchanger being constructed by repeatedly laminating the permeable membrane, the dry gas separator, the permeable membrane, and the moist gas separator in this order, wherein:

the dry gas separator and the moist gas separator each comprise:
a frame member;
a plurality of flow channels separated from one another by partitions arranged in parallel in a central portion surrounded by the frame member, the plurality of flow channels being open in the laminating direction;
a first supply manifold to which the gas caused to flow is supplied and a first exhaust manifold from which the gas caused to flow is discharged, the first supply and exhaust manifolds penetrating, in the laminating direction, those portions of the frame member which are respectively adjacent to both end portions of the plurality of flow channels;
two aggregate communication grooves penetrating the frame member in the laminating direction and being constructed by removing the frame member so as to respectively establish communication between the both ends of the plurality of flow channels and the first supply and exhaust manifolds;
first upper and lower seal formation plates which are in contact with the first supply manifold and bridged in a two-stage manner across one of the aggregate communication grooves in the laminating direction with a face contacting the permeable membrane being coplanar with a contacting face between the frame member and the permeable membrane, and which are offset from each other when projected onto each other;
second upper and lower seal formation plates which are in contact with the first exhaust manifold and bridged in a two-stage manner across the other of the aggregate communication grooves in the laminating direction with a face contacting the permeable membrane being coplanar with a contacting face between the frame member and the permeable membrane, and which are offset from each other when projected onto each other; and
second exhaust and supply manifolds disposed adjacent to the first supply and exhaust manifolds respectively and extending through the laminating direction; and
the first supply manifold, the first exhaust manifold, the second supply manifold, and the second exhaust manifold of the dry gas separator are superposed on the second supply manifold, the second exhaust manifold, the first supply manifold, and the first exhaust manifold of the moist gas separator, respectively, via through-holes formed in the permeable membrane.

2. A temperature-humidity exchanger according to claim 1, further comprising at least one of the following structures:
a projected image of the first upper seal formation plate which is projected in the laminating direction onto a plane including the first lower seal formation plate does not overlap with the first lower seal formation plate; and
a projected image of the second upper seal formation plate which is projected in the laminating direction onto a plane including the second lower seal formation plate does not overlap with the second lower seal formation plate.

3. A temperature-humidity exchanger according to claim 1, wherein the dry gas separator and the moist gas separator are provided with at least one of a support wall connected to the first upper and lower seal formation plates and a support wall connected to the second upper and lower seal formation plates.

4. A temperature-humidity exchanger according to claim 1, wherein faces of the partitions contacting the permeable membrane are coplanar with a face of the frame member contacting the permeable membrane.

5. A temperature-humidity exchanger according to claim 3, wherein at least one of the partitions is connected to the support walls.

6. A temperature-humidity exchanger according to claim 3, wherein the partitions exceed the support walls in number.

7. A temperature-humidity exchanger according to claim 1, wherein the dry gas separator and the moist gas separator are manufactured by resin molding.

* * * * *